US010207576B2

(12) United States Patent
Makino

(10) Patent No.: US 10,207,576 B2
(45) Date of Patent: Feb. 19, 2019

(54) IN-WHEEL MOTOR DRIVE DEVICE

(71) Applicant: NTN CORPORATION, Osaka (JP)

(72) Inventor: Tomoaki Makino, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/694,369

(22) Filed: Apr. 23, 2015

(65) Prior Publication Data

US 2015/0224868 A1    Aug. 13, 2015

Related U.S. Application Data

(63) Continuation of application No. PCT/JP2013/078546, filed on Oct. 22, 2013.

(30) Foreign Application Priority Data

Nov. 2, 2012   (JP) .................................. 2012-242463

(51) Int. Cl.
  *B60K 7/00* (2006.01)
  *B60L 15/20* (2006.01)
  (Continued)

(52) U.S. Cl.
  CPC .......... *B60K 7/0007* (2013.01); *B60K 17/046* (2013.01); *B60L 15/20* (2013.01);
  (Continued)

(58) Field of Classification Search
  CPC ............... B60L 2240/425; B60L 15/20; B60L 2220/44; B60K 2007/0092; B60K 7/0007;
  (Continued)

(56) References Cited

U.S. PATENT DOCUMENTS 5,014,800 A * 5/1991 Kawamoto .......... B60K 7/0007
                                                   180/65.51
5,127,485 A * 7/1992 Wakuta ................ B60K 7/0007
                                                   180/65.51
(Continued)

FOREIGN PATENT DOCUMENTS

CN         101652585 A      2/2010
CN         102056610 A      5/2011
(Continued)

OTHER PUBLICATIONS

Translation of WO2011/058844 (Year: 2011).*
(Continued)

*Primary Examiner* — Emma K Frick

(57) ABSTRACT

An in-wheel motor drive device includes an electric motor to drive a wheel, a wheel support bearing assembly to support the wheel, and a speed reducer to reduce the rotation of the electric motor and then to transmit it to the wheel support bearing assembly, and a lubricant oil is supplied under pressure by an oil pump to the speed reducer to be lubricated. The use is made of a temperature detector to detect the temperature of the lubricant oil or the electric motor and an output limitter to limit the output of the electric motor in the event that the temperature detected by the temperature detector is not higher than a predetermined threshold value.

4 Claims, 8 Drawing Sheets

(51) Int. Cl.
  *B60K 17/04* (2006.01)
  *F16H 57/04* (2010.01)
  *B60K 11/02* (2006.01)
  *B60K 1/00* (2006.01)
  *F16H 1/32* (2006.01)

(52) U.S. Cl.
  CPC ..... *F16H 57/0413* (2013.01); *F16H 57/0486* (2013.01); *B60K 11/02* (2013.01); *B60K 2001/006* (2013.01); *B60K 2007/0038* (2013.01); *B60K 2007/0092* (2013.01); *B60L 2220/14* (2013.01); *B60L 2220/44* (2013.01); *B60L 2240/36* (2013.01); *B60L 2240/423* (2013.01); *B60L 2240/425* (2013.01); *B60Y 2306/03* (2013.01); *F16H 2001/325* (2013.01); *Y02T 10/645* (2013.01); *Y02T 10/72* (2013.01); *Y02T 10/7275* (2013.01)

(58) Field of Classification Search
  CPC .............. B60K 11/01; B60K 2001/006; B60K 2007/0038; B60W 10/08
  See application file for complete search history.

(56) References Cited

U.S. PATENT DOCUMENTS

| | | | | |
|---|---|---|---|---|
| 5,372,213 | A * | 12/1994 | Hasebe | B60K 1/02 180/65.6 |
| 6,247,437 | B1 * | 6/2001 | Yamaguchi | B60K 6/445 123/179.3 |
| 6,592,486 | B1 * | 7/2003 | Arbanas | B60K 6/365 475/107 |
| 6,742,487 | B2 | 6/2004 | Yamaguchi et al. | |
| 7,958,959 | B2 * | 6/2011 | Yogo | B60G 3/20 180/65.51 |
| 8,108,101 | B2 * | 1/2012 | Murahashi | F16H 57/0434 180/339 |
| 8,145,384 | B2 * | 3/2012 | Murahashi | F16H 57/0434 180/339 |
| 8,160,773 | B2 * | 4/2012 | Nabeshima | B60B 11/06 180/339 |
| 8,428,818 | B2 * | 4/2013 | Murahashi | B60B 11/06 180/339 |
| 8,604,738 | B2 | 12/2013 | Takizawa | |
| 8,777,810 | B2 | 7/2014 | Kleila | |
| 8,800,702 | B2 * | 8/2014 | Yamamoto | B60G 3/20 180/65.51 |
| 8,978,799 | B2 * | 3/2015 | Arnold | B60K 6/26 180/65.22 |
| 9,724,995 | B2 * | 8/2017 | Ozaki | B60L 3/0061 |
| 2001/0022166 | A1 * | 9/2001 | Yamaguchi | B60K 6/445 123/179.3 |
| 2010/0191417 | A1 * | 7/2010 | Murahashi | B60B 11/06 701/36 |
| 2010/0286878 | A1 | 11/2010 | Lindgren et al. | |
| 2011/0095717 | A1 | 4/2011 | Takizawa | |
| 2011/0201475 | A1 | 8/2011 | Kleila | |
| 2013/0153338 | A1 | 6/2013 | Yamauchi | |

FOREIGN PATENT DOCUMENTS

| | | | |
|---|---|---|---|
| CN | 102162519 A | | 8/2011 |
| JP | 11-153075 | | 6/1999 |
| JP | 2000-125413 | | 4/2000 |
| JP | 2009-142036 | | 6/2009 |
| JP | 2009-248689 | | 10/2009 |
| JP | 2011-089625 | | 5/2011 |
| JP | 2011-114947 | | 6/2011 |
| JP | 2011-125121 | | 6/2011 |
| WO | WO2011/058844 | * | 5/2011 |
| WO | WO 2012/140963 A1 | | 10/2012 |

OTHER PUBLICATIONS

International Search Report dated Dec. 10, 2013 in corresponding international application PCT/JP2013/078546.
PCT International Preliminary Report on Patentability dated May 14, 2015 in corresponding International Patent Application No. PCT/JP2013/078546.
Extended European Search Report dated Jun. 13, 2016 in corresponding European Patent Application No. 13850086.3.
Chinese Office Action dated May 5, 2016 in corresponding Chinese Patent Application No. 201380056139.1.
Japanese Notification of Reasons for Rejection dated May 17, 2016 in corresponding Japanese Patent Application No. 2012-242463.
Chinese Office Action dated Dec. 12, 2016 in corresponding Chinese Patent Application No. 201380056139.1.
Japanese Office Action dated Dec. 20, 2016 in corresponding Japanese Patent Application No. 2012-242463.
Chinese Office Action dated Aug. 2, 2017 in related Chinese Application No. 201380056139.1.
Chinese Office Action dated Mar. 6, 2018 in corresponding Chinese Patent Application No. 201380056139.1.

* cited by examiner

IN-WHEEL MOTOR DRIVE DEVICE

CROSS REFERENCE TO THE RELATED APPLICATION

This application is a continuation application, under 35 U.S.C. § 111(a), of international application No. PCT/JP2013/078546, filed Oct. 22, 2013, which is based on and claims Convention priority to Japanese patent application No. 2012-242463, filed Nov. 2, 2012, the entire disclosure of which is herein incorporated by reference as a part of this application.

BACKGROUND OF THE INVENTION

1. Field of the Invention

The present invention relates to an in-wheel motor drive device in which a load acting on a speed reducer, reduction gear or the like during a low temperature drive can be relieved.

2. Description of Related Art

In the in-wheel motor drive device of a type in which a lubricant oil supplied under pressure by an oil pump is supplied to a motor and various parts of a speed reducer, proper oil supply to sites where the heat release value is markedly high is effective to efficiently avoid an abnormality resulting from the heat release. Along therewith, the stirring resistance by a rotating member can be lowered as compared with the dip-feed lubrication and, therefore, it is specifically effective in terms of improvement in efficiency. In particular, an effect of lowering the stirring resistance of the oil is prominent under a low temperature condition in which the viscosity of the lubricant oil is high and a high speed rotating condition.

PRIOR ART LITERATURE

Patent Document 1: JP Laid-open Patent Publication No. 2011-089625

DISCLOSURE OF THE INVENTION

On the other hand, as the temperature lowers, the fluidity of the lubricant oil lowers. Particularly under the temperature not higher than the flow point of the lubricant oil, no oil is nearly supplied by an oil pump. Thus, under a condition in which the supply of the lubricant oil is insufficient, the possibility will arise in which driving under a high load or a high speed rotation may result in a trouble and/or inconvenience in a site such as, for example, a bearing and/or a speed reducer.

In view of the foregoing, the present invention has for its primary object to provide an in-wheel motor drive device in which the load acting on the speed reducer during the low temperature drive can be relieved.

To describe the in-wheel motor drive device, herein provided in accordance with the present invention, with the aid of reference numerals used in the description of a preferred embodiment thereof as set forth hereinafter, the in-wheel motor drive device includes an electric motor 1 to drive a wheel 56, a wheel support bearing assembly 5 to support the wheel 56, and a speed reducer 2 to reduce the rotation of the electric motor 1 and then to transmit it to the wheel support bearing assembly 5, the speed reducer 2 being lubricated by a lubricant oil supplied under pressure by an oil pump 28. This in-wheel motor drive device also includes a temperature detector Sa to detect the temperature of the lubricant oil or the temperature of the electric motor 1 and an output limitter 49 to limit the output of the electric motor 1 in the event that the temperature detected by the temperature detector Sa attains a value not higher than a predetermined threshold value.

According to the present invention, the speed reducer 2 is lubricated by the lubricant oil supplied under pressure by the oil pump 28 during the operation. The temperature detector Sa detects the temperature of the lubricant oil or the electric motor 1. This temperature detector Sa is provided in, for example, a tank 29 to reserve the lubricant oil therein or in a flow circuit of the lubricant oil. The output limitter 49 determines whether or not the temperature detected by the temperature detector Sa is not higher than the predetermined threshold value. When the temperature is determined higher than the predetermined threshold value, a motor torque is outputted in dependence on the degree to which an accelerator pedal is depressed. The output limitter 49, when the decision is made that the temperature detected is not higher than the predetermined threshold value, limits the output of the electric motor 1 to a value that is within, for example, the range of 10 to 90% of the maximum torque during a normal temperature condition.

As hereinabove discussed, with the output of the electric motor 1 being limited in the manner described above, it is possible to avoid the possibility that an abnormality such as, for example, an excessive frictional wear to the speed reducer, may occur even under a low temperature condition in which the amount of the oil supplied is insufficient. It is to be noted that the wording "temperature not higher than the predetermined value" hereinabove and hereinafter referred to should be understood as speaking of an extremely low temperature of, for example, not higher than −40° C. The threshold value is properly determined by means of experiments and/or simulations with reference to the temperature at which the abnormality such as, for example, the excessive frictional wear may occur in the speed reducer 2 or the bearing in the in-wheel motor drive device.

In a preferred embodiment of the present invention, the oil pump 28 may be built in the in-wheel motor drive device and is adapted to be driven by the rotation of a drive motor, which is a drive source for the oil pump, or of the speed reducer 2. Since the oil pump 28 is built in the in-wheel motor drive device, mounting or removal of the in-wheel motor drive device on or from the automotive vehicle can be eased and, hence, the number of assembling steps can be reduced.

In another preferred embodiment of the present invention, the oil pump 28 referred to above may be provided outside of the in-wheel motor drive device and is adapted to be driven by a drive source 28a other than the in-wheel motor drive device. In this case, the temperature detector Sa can be easily installed on an intermediate portion of a flow path for the lubricant oil.

In a further preferred embodiment of the present invention, the output limitter 49 may cause an output of the electric motor to vary in accordance with the temperature in the event that the temperature detected by the temperature detector Sa attains the value not higher than the predetermined threshold value. The output limitter 49 can gradually migrate the limit value of the output of the electric motor 1 in accordance with, for example, the increase of the temperature. Accordingly, in the event that the temperature detected increases from a value not higher than the threshold value to a value higher than the threshold value, a steep recovery of the output of the electric motor 1 is suppressed to provide an output characteristic with which vehicle passengers will not feel uncomfortable.

In a still further preferred embodiment of the present invention, the output limitter 49 may include a storage part 51 to storage a limit value of the output of the electric motor 1 as a map for each predetermined temperature. The output limitter 49 will be such that the output of the electric motor 1 can be easily and assuredly limited in accordance with each map set up for each predetermined temperature.

In a yet further preferred embodiment of the present invention, the use may be made of a tank 29 for the storage of the lubricant oil, in which the temperature detector Sa is provided within this tank 29. Since the tank 29 accommodates therein the lubricant oil in an amount greater than a constant value, for example, rather than detecting the temperature at an intermediate portion of the flow path of the lubricant oil, the temperature of the lubricant oil so stored can be stably detected.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
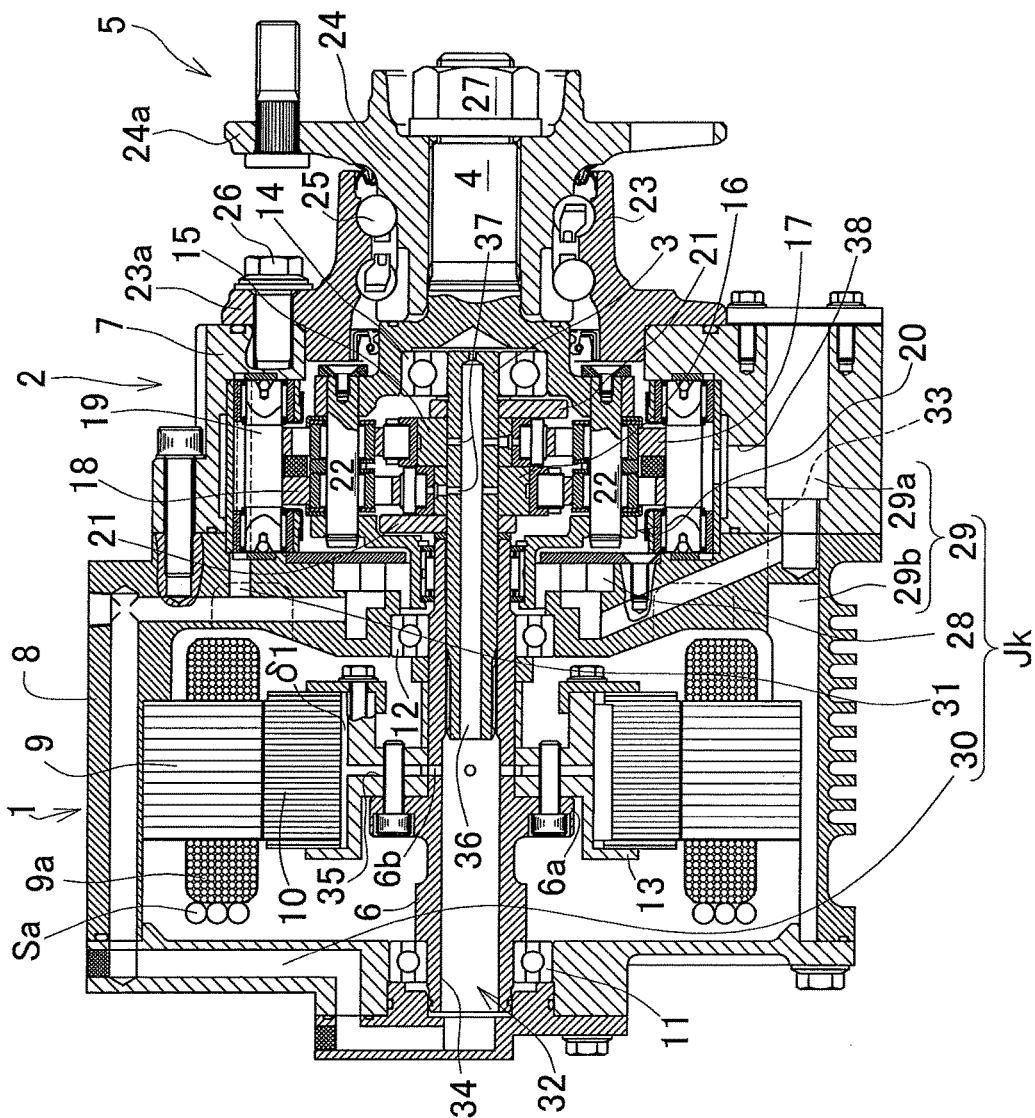
FIG. 1 is a longitudinal sectional view showing an in-wheel motor drive device according to a first preferred embodiment of the present invention.

An in-wheel motor drive device designed in accordance with the first preferred embodiment of the present invention will now be described with particular reference to FIGS. 1 to 6, it being to be noted that the description hereinafter set forth in connection with the embodiment of the present invention should be understood as containing a description of a control method for the in-wheel motor drive device. As shown in FIG. 1 (a cross sectional view taken along the line I-I in FIG. 3), an in-wheel motor drive device shown therein includes an electric motor 1 for driving a wheel, a speed reducer 2 in the form of a reduction gear unit for reducing the rotation of the electric motor 1, a wheel support bearing assembly 5 adapted to be driven by the rotation of an output shaft 4 to be coaxial to an input shaft 3 of the speed reducer 2, and a lubricant oil supply mechanism Jk. The speed reducer 2 is interposed between the wheel support bearing assembly 5 and the electric motor 1, and a hub of the wheel, which is a driven wheel supported by the wheel support bearing assembly 5, and a motor rotary shaft 6 are connected coaxially with each other.

Figure 2:
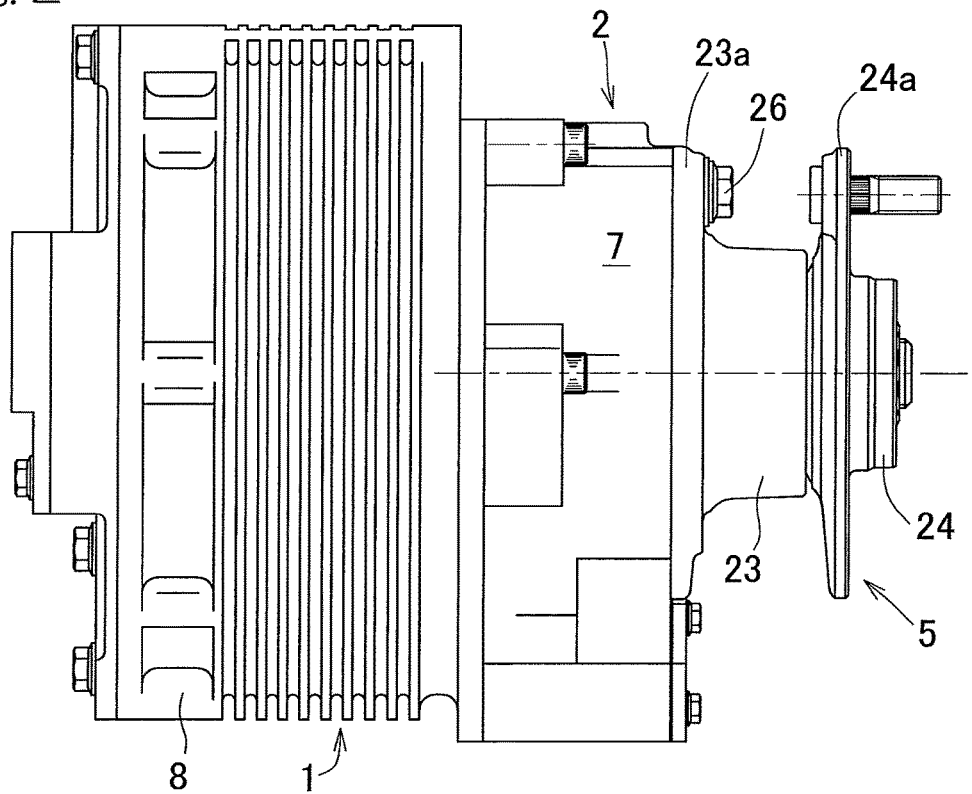
FIG. 2 is a side view of the in-wheel motor drive device.

As shown in FIG. 2, a speed reducer housing 7 accommodating therein the speed reducer 2 has a suspension system (not shown) in an automotive vehicle connected therewith. It is to be noted that in describing the embodiment(s) of the present invention, terms "outboard side" and "inboard side" represent one side of the vehicle body away from the center in the lateral or transverse direction of the vehicle body and the other side of the vehicle body close to the center in the lateral or transverse direction of the vehicle body, respectively, when the in-wheel motor drive device is mounted on the automotive vehicle.

Figure 3:
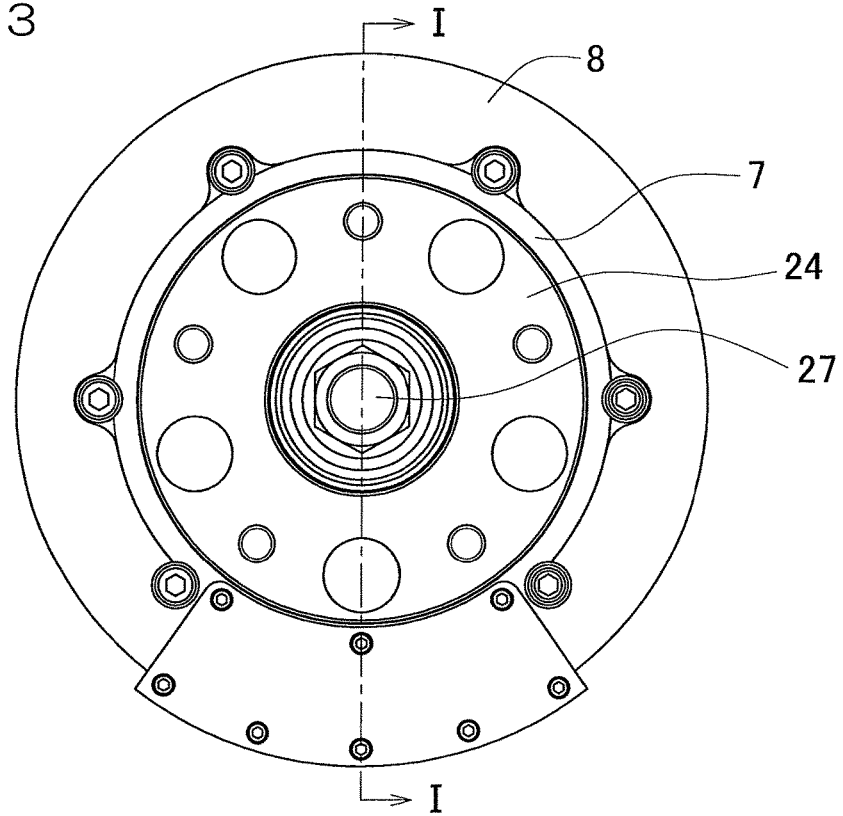
FIG. 3 is an end view of the in-wheel motor drive device.

As shown in FIG. 1, the electric motor 1 is employed in the form of an IPM (abbr. for Interior permanent Magnet) synchronous motor of a radial gap design having a radial gap defined between a motor stator 9, fixed to a generally or substantially cylindrical motor housing 8 shown in FIG. 3, and a motor rotor 10 fitted to the motor rotary shaft 6. The motor housing 8 has bearings 11 and 12 that are axially spaced apart from each other, and the motor rotary shaft 6 referred to previously is rotatably supported by and between those bearings 11 and 12. The motor rotary shaft 6 is used for transmitting a drive force of the electric motor 1 to the speed reducer 2. This motor rotary shaft 6 has a flanged portion 6a defined at an axially intermediate portion of the motor rotary shaft 6 so as to extend radially outwardly from such motor rotary shaft 6, with the motor rotor 10 fitted to such flanged portion 6a through a rotor fixing member 13.

A temperature detector Sa for detecting the temperature of the electric motor 1 is provided in, for example, a motor coil 9a in the motor stator 9. For this temperature detector Sa, a thermistor, for example, is used. With the thermistor fixed in contact with the motor coil 9a, the temperature of the motor coil 9a in the electric motor 1 can be detected as a parameter of the temperature of the electric motor 1.

The speed reducer 2 has an input shaft 3 having a first axial end extending into the motor rotary shaft 6 and is then splined to such motor rotary shaft 6 for rotation together therewith. The speed reducer 2 also has an output shaft 4 having a bearing 14 carried by such output shaft 4, and a second axial end of the input shaft 3, which is opposite to the first axial end thereof referred to above, is supported by the bearing 14. Accordingly, the input shaft 3 of the speed reducer 2 and the motor rotary shaft 6 are rotatably supported together by the bearings 11, 12 and 14. Within the speed reducer housing 7, a portion of an outer peripheral surface of the input shaft 3 adjacent the second axial end thereof is provided with eccentric lobes 15 and 16, and those eccentric lobes 15 and 16 are displaced 180° in phase from each other about the longitudinal axis of the input shaft 3 so that centrifugal forces resulting from the eccentric movement can be counterbalanced.

The speed reducer 2 is preferably of a type having a reduction ratio of ⅙ or lower (or a reduction ratio of 6 or higher). This speed reducer 2 is in the form of a cycloid gear reducer comprised of curved plates 17 and 18, a plurality of outer pins 19, a motion translating mechanism 20, and counterweights 21 and 21. The curved plates 17 and 18 have respective outer peripheries curved in a sense opposite to each other in respective directions radially inwardly and radially outwardly and are provided rotatably in the eccentric lobes 15 and 16. The plurality of the outer pins 19 are supported by and between the motor housing 8 and the speed reducer housing 7 while having been held in sliding contact with the respective outer peripheries of the curved plates 17 and 18.

The motion translating mechanism 20 referred to previously is a mechanism for transmitting respective rotating motions of the curved plates 17 and 18 to the output member 4 and is composed of a plurality of inner pins 22, which are provided in the output member 4, and a throughhole defined in each of the curved plates 17 and 18. The inner pins 22 are disposed equidistantly spaced in a circumferential direction about the axis of rotation of the output shaft 4. The counterweights 21 and 21 referred to previously are provided at respective axial positions of the input shaft 3 of the speed reducer 2 adjacent to the eccentric lobes 15 and 16.

The wheel support bearing assembly 5 includes an outer member 23 having an inner periphery formed with a plurality of rows of raceway surfaces, an inner member 24 having an outer periphery provided with raceway surfaces that are opposed to those raceway surface in the outer member 23, and a plurality of rows of rolling elements 25 interposed between the opposed raceway surfaces in the respective outer and inner members 23 and 24. The inner member 24 concurrently serves as a hub on which the drive wheel is mounted. The wheel support bearing assembly 5 of the structure so described is rendered to be an dual row angular contact ball bearing, in which the rolling elements 25 are in the form of balls that are retained by a retainer for each row.

The outer member 23 will serve as a stationary side raceway ring and has a flange 23a defined therein, which flange 23a is fitted to an outboard side end of the speed reducer housing 7. As shown in FIG. 2, the flange 23a has a plurality of bolt insertion holes defined therein at the corresponding number of circumferential sites thereof, and the speed reducer housing 7 is provided with a correspondingly plurality of bolt threading holes in the form of female threaded threads at respective locations aligned to the bolt insertion holes in the flange 23a. When mounting bolts 26 having been passed through the bolt insertion holes in the flange 23a are threaded firmly into the corresponding bolt threading holes, the outer member 23 is fitted to the speed reducer housing 7.

As shown in FIG. 1, the inner member 24 has a bore defined therein for the passage of the output member 4 therethrough and has a step defined in an outer peripheral surface of the bore on the inboard side with an inner ring firmly mounted on this step. The inner member 24 also has the outer peripheral surface formed integrally with the pair of the raceway surfaces and the raceway surfaces of the other row are formed in the outer peripheral surface of the inner ring referred to above. An outboard side end of the inner member 24 is provided with a wheel mounting hub flange 24a for the support of the wheel. The bore in the inner member 24 has its peripheral surface formed with spline serrations so that the output member 4, when inserted into the bore in the inner member 24, can be splined to the bore in the inner member 24. The output member 4 has a tip end portion formed with a male thread and, as a nut 27 is threaded onto the tip end portion of the output member 4, which protrudes outwardly from the bore in the inner member 24, the output member 4 and the inner member 24 are threadingly connected with each other.

The lubricant oil supply mechanism Jk is a shaft center oil supply mechanism for supplying a lubricant oil which is used for lubrication of the speed reducer 2 and also for cooling of the electric motor 1 and includes a lubricant oil passage, an oil pump 28 and a tank 29. The lubricant oil passage includes a first flow path 30 defined in the motor housing 8, a second flow path 31 defined in the speed reducer 2 in communication with the first flow path 30 and a third flow path as will be described hereinafter to supply the lubricant oil to the speed reducer 2, and the third flow path 32. The tank 29 is a reservoir for storing the lubricant oil and includes a speed reducer side reservoir 29a and a motor side reservoir 29b. The speed reducer side reservoir 29a is provided in a lower portion of the speed reducer housing 7 whereas the motor side reservoir 29b is provided in a lower portion of the motor housing 8. The respective lower portions of the motor housing 8 and the speed reducer housing 7 are formed with a throughhole 33 through which the speed reducer side reservoir 19a and the motor side reservoir 29b are communicated with each other.

The oil pump 28 is, in the illustrated embodiment, provided in an intermediate portion of the first flow path 30 of the lubricant oil passage, for forcibly circulating the lubricant oil. This oil pump 28 is employed in the form of, for example, a cycloid pump having an inner rotor (not shown) adapted to be rotated by the rotation of the output member 4, an outer rotor adapted to be driven by the rotation of the inner rotor, a pumping chamber, an intake port and an output port. When the inner rotor is rotated by the rotation of the inner member 24, the outer rotor is driven thereby. At this time, inner rotor and the outer rotor are rotated about different axes of rotation, respectively, accompanied by a continuous change of the volume of the pump chamber.

Accordingly, the lubricant oil stored within the speed reducer side reservoir 29a of the tank 29 is sucked to flow from the intake port and is then supplied under pressure from the discharge port to the first and second flow paths 30 and 31. The lubricant oil supplied from the second flow path 31 to the speed reducer 2 moves radially outwardly and then downwardly under the influence of the centrifugal force and the gravitational force respectively and is then returned to the speed reducer side reservoir 29a of the tank 29.

The third flow path 32 includes a motor rotary shaft oil pathway 34 defined in the motor rotary shaft 6, a motor oil pathway 35, a throughhole 6b, an annular gap δ1, an input shaft oil pathway 36 defined in the input shaft, an oil supply port 37, and an oil discharge port 38. The motor rotary shaft oil pathway 34 is communicated to a downstream portion of the first oil path 30 with respect to the direction of supply of the oil under pressure and is provided along the longitudinal axis of the motor rotary shaft 6. The input shaft oil pathway 36 is communicated with the motor rotary shaft oil pathway 34 and extends from the inboard side end within the input shaft 3 towards the outboard side. The oil supply port 37 extends in a direction radially outwardly from an axial position of the input shaft oil pathway 36, where the eccentric lobes 15 and 16 are provided. The speed reducer housing 7 is provided with the oil discharge port 38 through which the lubricant oil supplied to the speed reducer 2 for lubrication thereof is discharged to the speed reducer side reservoir 29a.

At an axial position of the motor rotary shaft 6, where the rotor fixing member 13 is provided, a plurality of radially extending throughholes 6b are provided. Also, the rotor fixing member 13 is provided with the motor oil pathway 35 communicated with the plurality of the throughholes 6b and extending radially outwardly. This motor oil pathway 35 is communicated with the annular gap δ1 delimited between the rotor fixing member 13 and the inner peripheral surface of the motor rotor 10. The lubricant oil guided from the motor rotary shaft oil pathway 34 to the throughholes 6b is guided towards the annular gap δ1 thorough the motor oil pathway 35 to cool the electric motor. The lubricant oil so supplied for cooling is discharged from a slit between a flange of the rotor fixing member 13 and opposite end faces of the motor rotor 10 and is then moved downwardly under the influence of the centrifugal force and the gravitational force thereafter before it is reserved within the motor side reservoir 29b.

Figure 4:
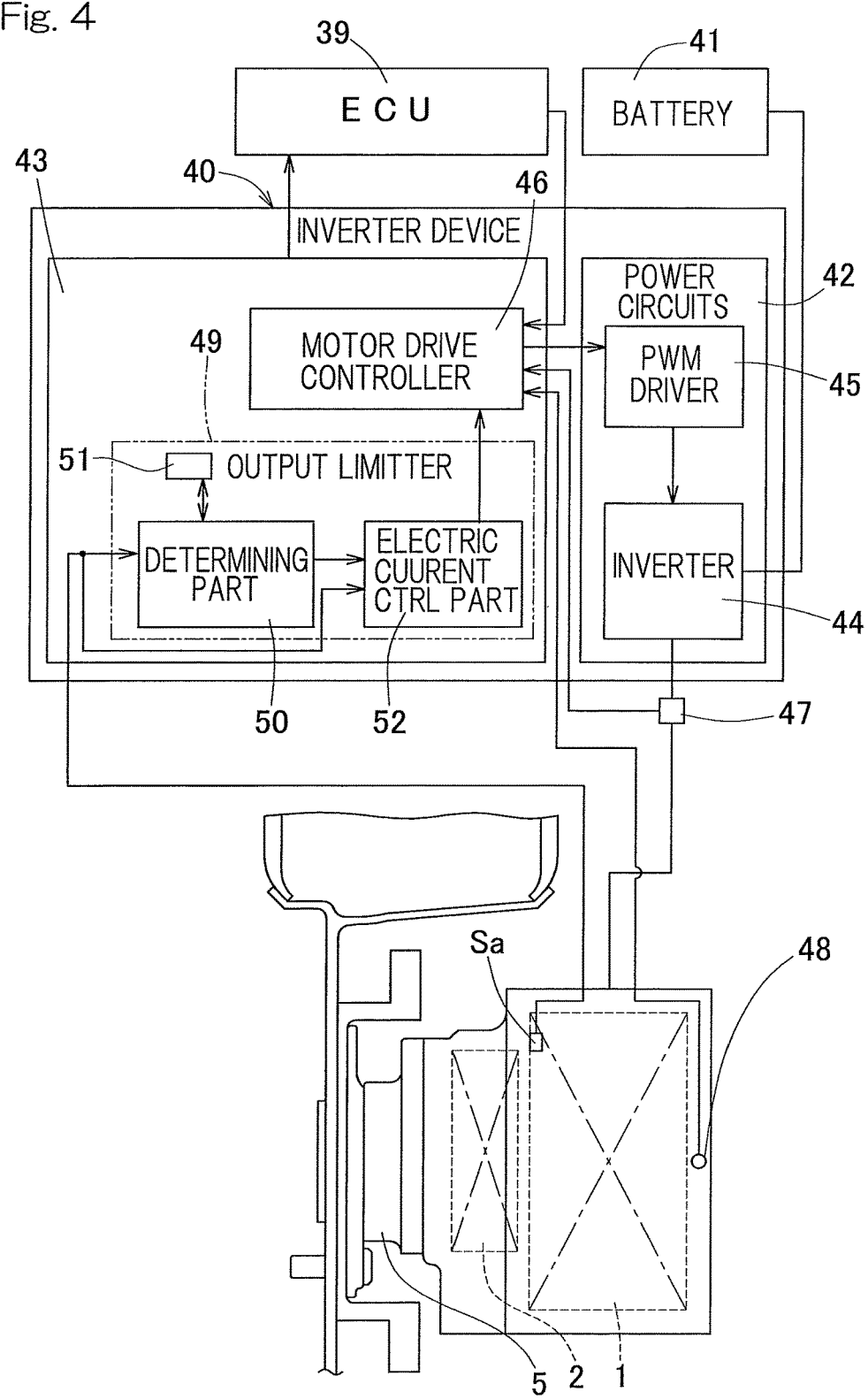
FIG. 4 is a circuit block diagram showing a control system used in the in-wheel motor drive device.

FIG. 4 illustrates a block diagram showing a control system of the in-wheel motor drive device. The vehicle body had an electronic control unit (ECU) 39, an inverter device 40 and a battery 41 all mounted thereon. The electronic control unit 39 performs an integrated control and a cooperative control of the automotive vehicle in its entirety and is a host control unit that provide the inverter device 4 with commands, all of which are connected with each other through, for example, a control area network (abbr.: CAN) or the like. The electronic control unit 39 is comprised of a microcomputer and the control program therefor and electronic circuits and so on.

The inverter device 40 includes a power circuit 42, provided for each of the electric motors 1, and a motor controller 43 for controlling the power circuit 42. The motor controller 43 may be provided commonly to each of the power circuits 42 or provided separately, but even where it is provided commonly, each of the power circuits 42 is rendered to be independently controllable so that, for example, motor torques may be differentiated from each other. The motor controller 43 has a function of outputting to the electronic control unit 39 various pieces of information such as, for example, detection values and/or control values, possessed by the motor controller 43 in association with the in-wheel motor drive device.

The power circuit 42 includes an inverter 44 for converting the direct current electric power of the battery 41 into the three phase alternating power that is used to drive the electric motor 1 and a PWM driver 45 for controlling the inverter 44. The electric motor 1 is in the form of a three phase synchronous motor. The inverter 44 includes a plurality of semiconductor switching elements (not shown) and the PWM driver 45 is operable to perform a pulse width modulation of an electric current command inputted so that an ON/OFF command can be applied to each of the semiconductor switching elements referred to above.

The motor controller 43 is comprised of a computer and a program, executed thereby, and electronic circuits and includes, as a basic control unit, a motor drive controller 46. The motor drive controller 46 is operable to convert into an electric current command in accordance with an acceleration or deceleration command delivered by, for example, a torque command supplied from the electronic control unit 39 that is a host control unit and then to apply the electric current command to the PWM driver 45 of the power circuit 42. The motor drive controller 46 referred to above acquires a motor current value, which is to be supplied from the inverter 44 to the electric motor 1, from an electric current detector 47 to thereby perform an electric current feedback control. Also, the motor drive controller 46 acquires the angle of rotation of the motor rotor 10, shown in FIG. 1, of the electric motor 1, which is fed from an angle sensor 48, to perform a vector control.

In the practice of the above described embodiment of the present invention, the motor controller 43 of the structure described above is provided with the following output limitter 49 and the motor coil 9a shown in FIG. 1 is provided with the temperature detector Sa for detecting the temperature of the electric motor 1. The output limitter 49 is of a type capable of limiting the output of the electric motor 1 in the event that the temperature detected by the temperature detector Sa is not higher than the predetermined threshold value, and includes a determining part 50, a storage part 51 and an electric current control part 52.

The determining part 50 is operable to perform a decision at all times at the time the automotive vehicle is electrically powered on, to determine whether or not the temperature detected by the temperature detector Sa is not higher than the predetermined threshold value. It is to be noted that the wording "temperature not higher than the predetermined value" hereinabove and hereinafter referred to is rendered to be, for example, an extremely low temperature of −40° C. or lower. This threshold value is determined by means of, for example, experiments and/or simulations with reference to the temperature at which the abnormality such as the excessive frictional wear may occur in the speed reducer 2 or the bearing employed in the in-wheel motor drive device. This threshold value is rewritably stored in the storage part 51 and is read out at the time of decision made by the determining part 50 for use in calculation.

In the event that the temperature detected is determined as not higher than the threshold value, the electric current control part 52 issues a command to the power circuit 42 through the motor drive controller 46 so that the electric current value of the electric motor 1 may be reduced. Specifically, so that the motor torque may become a value within, for example, the range of 10 to 90% of the maximum torque at normal temperatures, the electric control part 52 provides the power circuit 42 with the command through the motor drive controller 46. It is to be noted that the electric current control part 52 may lower at a predetermined proportion (for example, 10 to 90%) relative to the current electric current, or may lower down to a value, not proportion, (for example, to set the upper limit of the vehicle travelling speed to the value about equal to the city cruising velocity).

Figure 5:
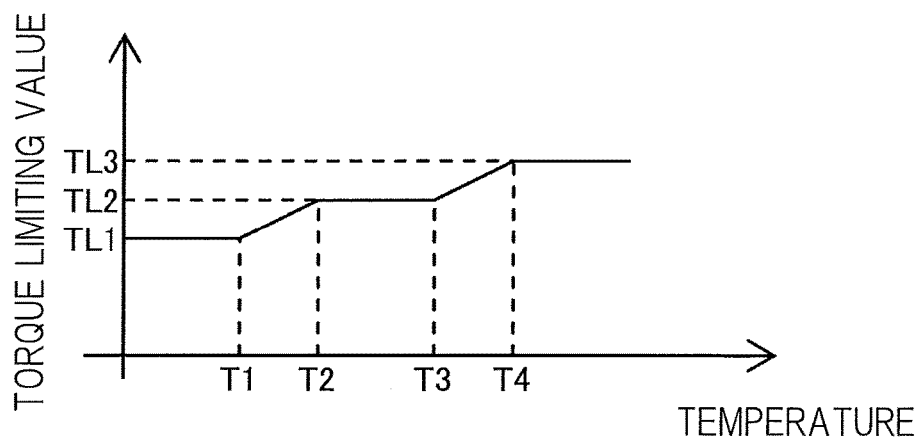
FIG. 5 is a chart showing the relationship between the temperature and the torque limit value.

The storage part 51 referred to above stores therein a limit value of the output of the electric motor 1 for each predetermined temperature, as a map. In other words, the storage part 51 has a limit map for each predetermined temperature. By way of example, FIG. 5 illustrates the relationship between the temperature and the torque limit value. Temperatures T1 to T4 on the axis of abscissas in the chart of FIG. 5 are all not higher than the threshold value. The output limitter 49 referred to previously renders the motor torque to be a torque limit value TL1 which is most limited, in the event that the temperature detected by the temperature detector Sa is not higher than the most lowest temperature T1. The output limitter 49 gradually mitigates the torque limit value with the increase of the temperature detected.

Figure 6:
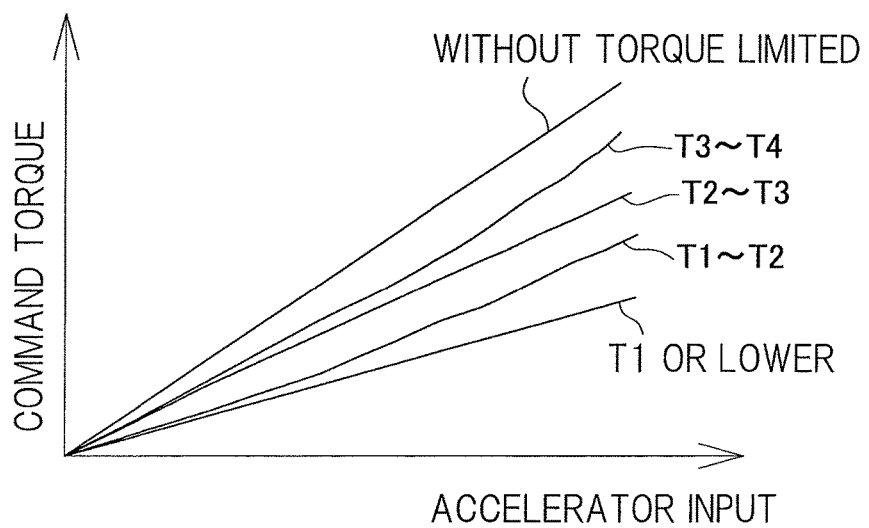
FIG. 6 is a chart showing the relationship between an acceleration input and a commanded torque.

FIG. 6 illustrates a chart showing the relationship between the accelerator input and the command torque when the map for each temperature is set up. The limit map for each temperature as hereinbefore described is stored in the storage part 51, the limit map is read out from the storage part 51 in dependence on the temperature detected, and it is provided for calculation by the determining part 50. Accordingly, the lower the temperature detected by the temperature detector Sa, the larger the limit of the command torque. In this case, for the same command torque, the lower the temperature, the lower the current value of the electric motor 1.

Functions and effects will now be described. During the condition in which the automotive vehicle is electrically powered on, the determining part 50 of the output limitter 49 determines at all times whether or not the temperature detected by the temperature detector Sa is not higher than the predetermined threshold value. In the event that the temperature detected is determined not higher than the threshold value, the electric current control part 52 issues a command to the power circuit 42 through the motor drive controller 46 so that the electric current of the electric motor 1 may be lowered. Accordingly, the output of the electric motor 1 is limited. Thus, by limiting the output of the electric motor 1, it is possible to avoid the occurrence of an abnormality such as an excessive frictional wear occurring, for example, in the speed reducer even under the low temperature condition in which the oil supply amount of the lubricant oil supplied is insufficient.

Since the oil pump 28 is provided within a housing for the in-wheel motor drive device, the in-wheel motor drive device can be easily mounted on or removed from the automotive vehicle. Not only is there no need to provide the oil pump 28 itself solely with the automotive vehicle, but the labor, for example, required to fix the tubing in the vehicle body can be reduced. Accordingly, the number of assembling steps can be reduced.

The output limitter 49 is so designed as to vary the output of the electric motor 1 in dependence on the temperature in the event that the temperature detected by the temperature detector Sa is not higher than the predetermined threshold value. On the other hand, the output limitter 49 can gradually mitigate the limit value of the output of the electric motor 1 with, for example, the increase of the temperature. Accordingly, when the temperature detected increases from a value not higher than the threshold value to a value higher than that threshold value, a steep recovery of the output of the electric motor 1 is suppressed to provide such an output characteristic with which vehicle passengers will not feel uncomfortable.

The output limitter 49 referred to above includes the storage part 51 in which the limit value of the output of the electric motor 1 is stored as a map for each predetermined temperature. For this reason, the output limitter 49 can easily and assuredly limit the output of the electric motor 1 according to each map set for each predetermined temperature.

Another preferred embodiment of the present invention will now be described. It is, however, to be noted that in the description that follows, component parts similar to those shown and described in connection with the preceding embodiments of the present invention are shown by like reference numerals and, therefore, the details thereof are not reiterated for the sake of brevity. Where only a part of the construction is described, the remaining part of the construction is to be understood as similar to that in the preceding embodiment or embodiments unless otherwise specified. Similar functions and effects are delivered from the identical construction. It is also to be noted that it is possible not only to combine components specifically described in connection with each of the foregoing and following embodiments of the present invention, but also to partially combine two or more of the foregoing and following embodiments of the present invention unless the combined art causes malfunction.

Figure 7:
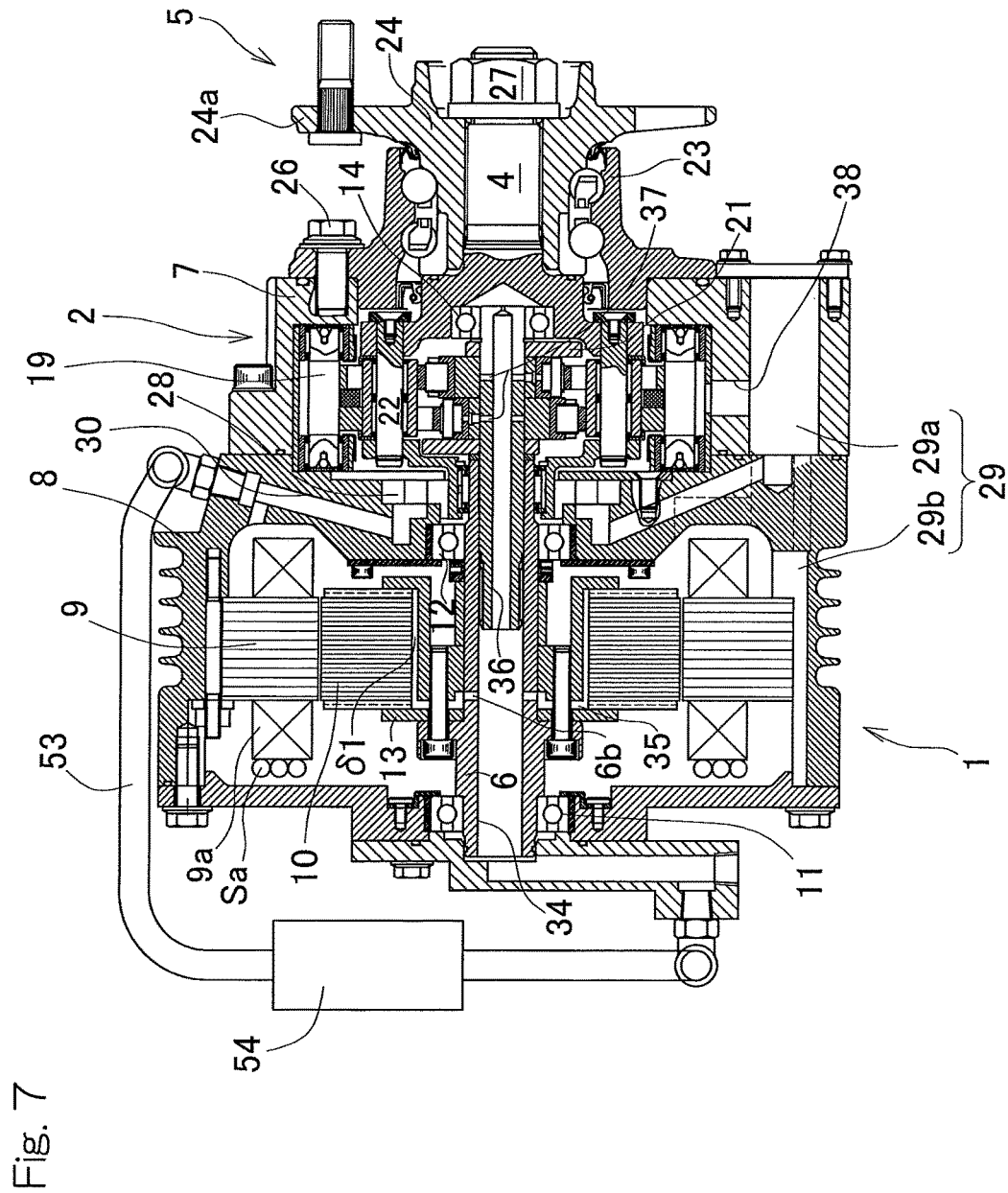
FIG. 7 is a longitudinal sectional view showing the in-wheel motor drive device according to a second preferred embodiment of the present invention.

FIG. 7 illustrates a longitudinal sectional view showing the in-wheel motor drive device designed in accordance with a second preferred embodiment of the present invention. As shown therein, an oil cooler 54 may be provided outside of the housings 7 and 8 in the in-wheel motor drive device. When the built-in oil pump 28 is driven, the lubricant oil stored within the speed reducer side reservoir 29a in the tank 29 is sucked up and a portion thereof flows into the speed reducer 2 and is then fed under pressure to the first flow path 30. Thereafter, the lubricant oil is guided from the first flow path 30 to the motor rotary shaft oil pathway 34 through an external tube 53 and the oil cooler 54. Hereinafter, the lubricant oil is supplied to the various parts in a manner similar to that described in connection with the previously described first embodiment of the present invention.

Figure 8:
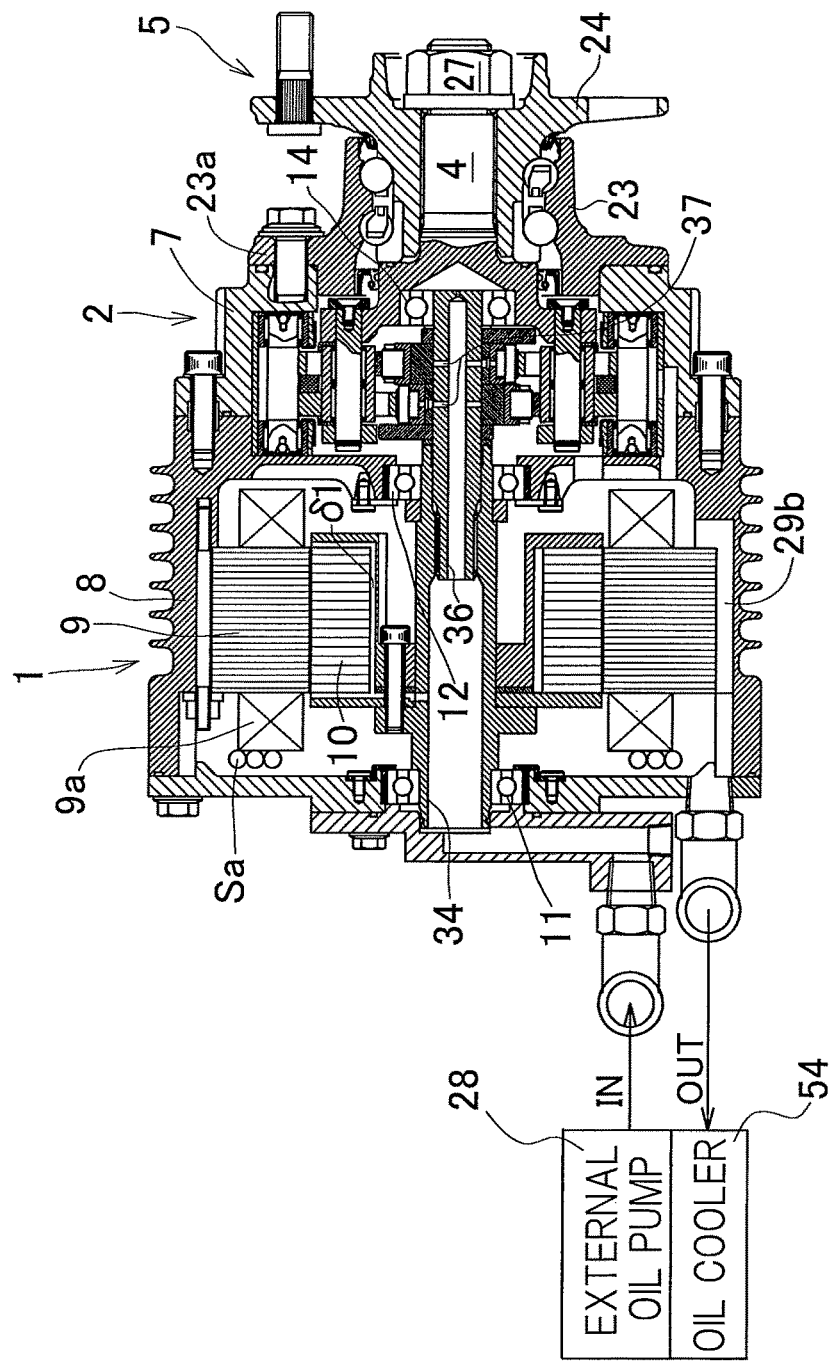
FIG. 8 is a longitudinal sectional view showing the in-wheel motor drive device according to a third preferred embodiment of the present invention.
Figure 9:
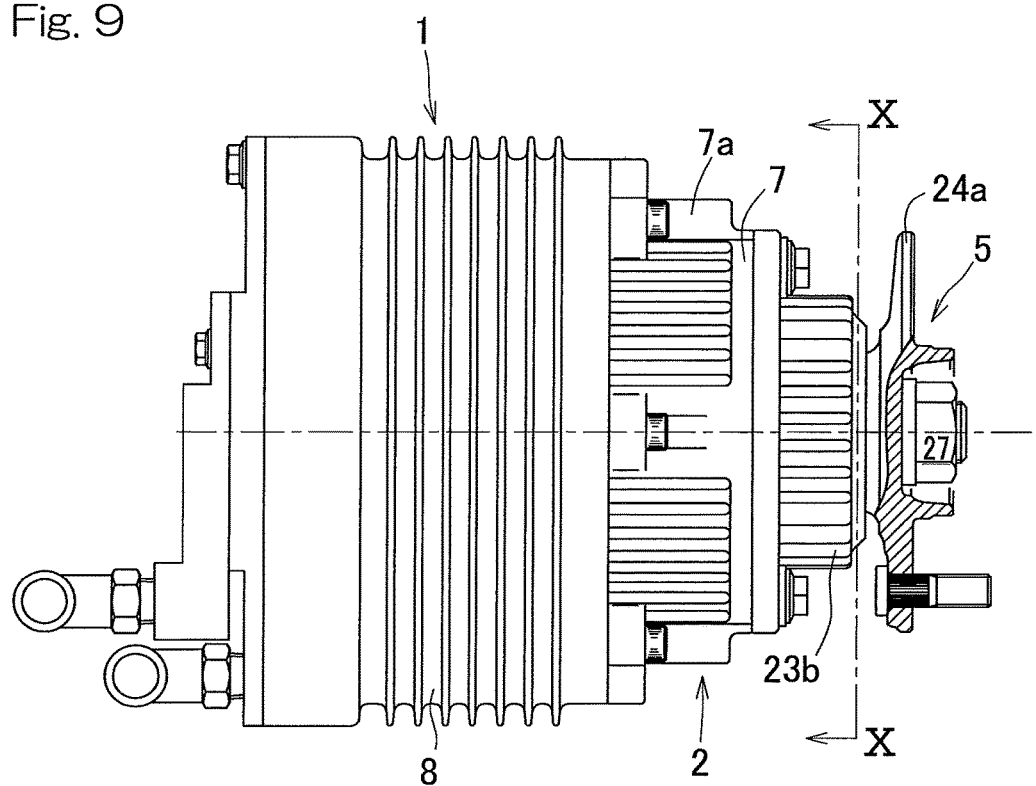
FIG. 9 is a side elevational view of the in-wheel motor drive device shown in FIG. 8.
Figure 10:
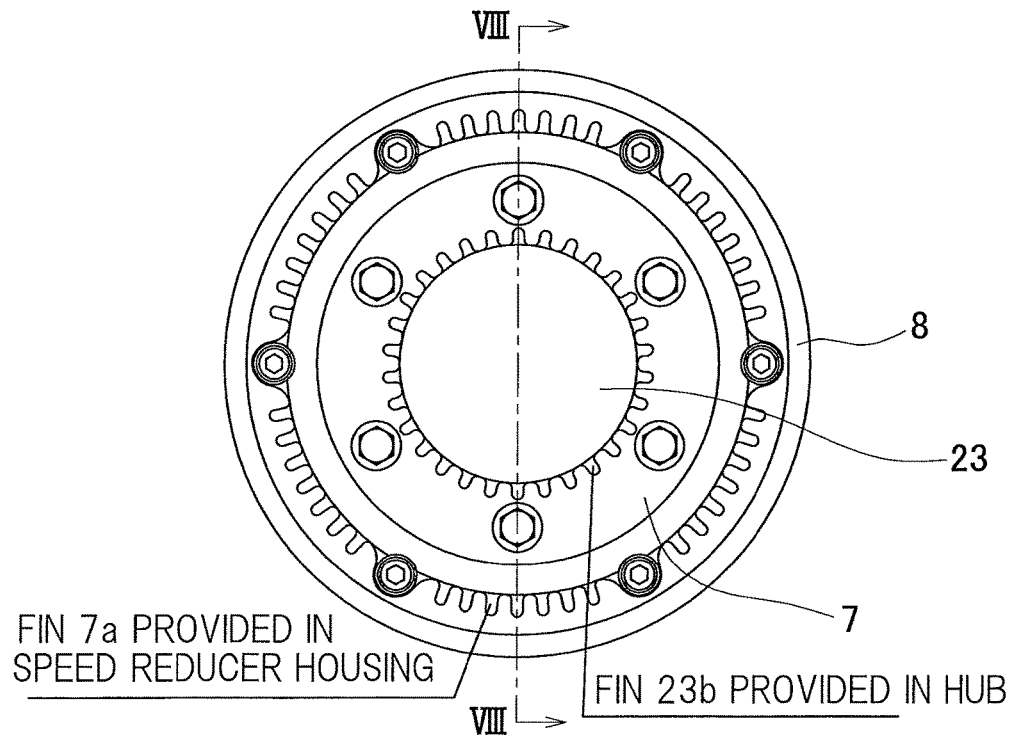
FIG. 10 is an end view of the in-wheel motor drive device shown in FIG. 8.

FIG. 8 is a longitudinal sectional view (corresponding to a cross sectional view taken along the line VIII-VIII in FIG. 10) of the in-wheel motor drive device designed in accordance with a third preferred embodiment of the present invention. FIG. 9 is a side elevational view of the in-wheel motor drive device shown in FIG. 8 and FIG. 10 is an end view (corresponding to a cross sectional view taken along the line X-X in FIG. 9) of the in-wheel motor drive device shown in FIG. 8.

As shown in FIG. 8, the housings 7 and 8 of the in-wheel motor drive device are provided with the external oil pump 28, which is driven by a drive source different from the in-wheel motor drive device. In this example, no speed reducer side reservoir is employed. As shown in FIGS. 9 and 10, fins 7a and 23b are provided on the outer peripheral surface of the speed reducer housing 7 and that of the outer member 23.

The lubricant oil supplied to the speed reducer 2 moves radially outwardly and downwardly under the effect of the centrifugal force and the gravitational force thereafter and is then stored within the motor side reservoir 29b of the tank. When the oil pump 28 is driven, the lubricant oil stored within the motor side reservoir 29b is sucked up and is then guided to the oil pump 28 through the oil cooler 54. The lubricant oil discharged from the oil pump 28 is guided towards the motor rotary shaft oil pathway 34. Hereinafter, the lubricant oil is supplied to the various parts in a manner similar to that described in connection with the previously described first embodiment of the present invention. In this case, the speed reducer side reservoir is dispensed with and, therefore, in order to reduce oil paths to be provided in the housings 7 and 8, the device main body can be compactized. Accordingly, the versatility of the in-wheel motor drive device, for which the in-wheel motor drive device can be mounted on various types of automotive vehicles, can be enhanced. Since the fins 7a and 23b are provided on the outer peripheral surface of the speed reducer housing 7 and the outer peripheral surface of the outer member 23, respectively, the surface area of the outer surface of the in-wheel motor drive device can be increased to increase the heat dissipating effect.

Although in describing the foregoing embodiments of the present invention the temperature detector Sa has been shown and described as provided in the motor coil 9a, the present invention is not necessarily limited thereto and the temperature detector Sa may be provided in, for example, a motor core or within the tank for storing the lubricant oil therein. Also, the temperature detector Sa may be provided on an intermediate portion of the flow path for the lubricant oil. Also, in the foregoing embodiments of the present invention the limit map has been provided for each temperature, but arrangement may be made with no limit map for each temperature employed.

Figure 11:
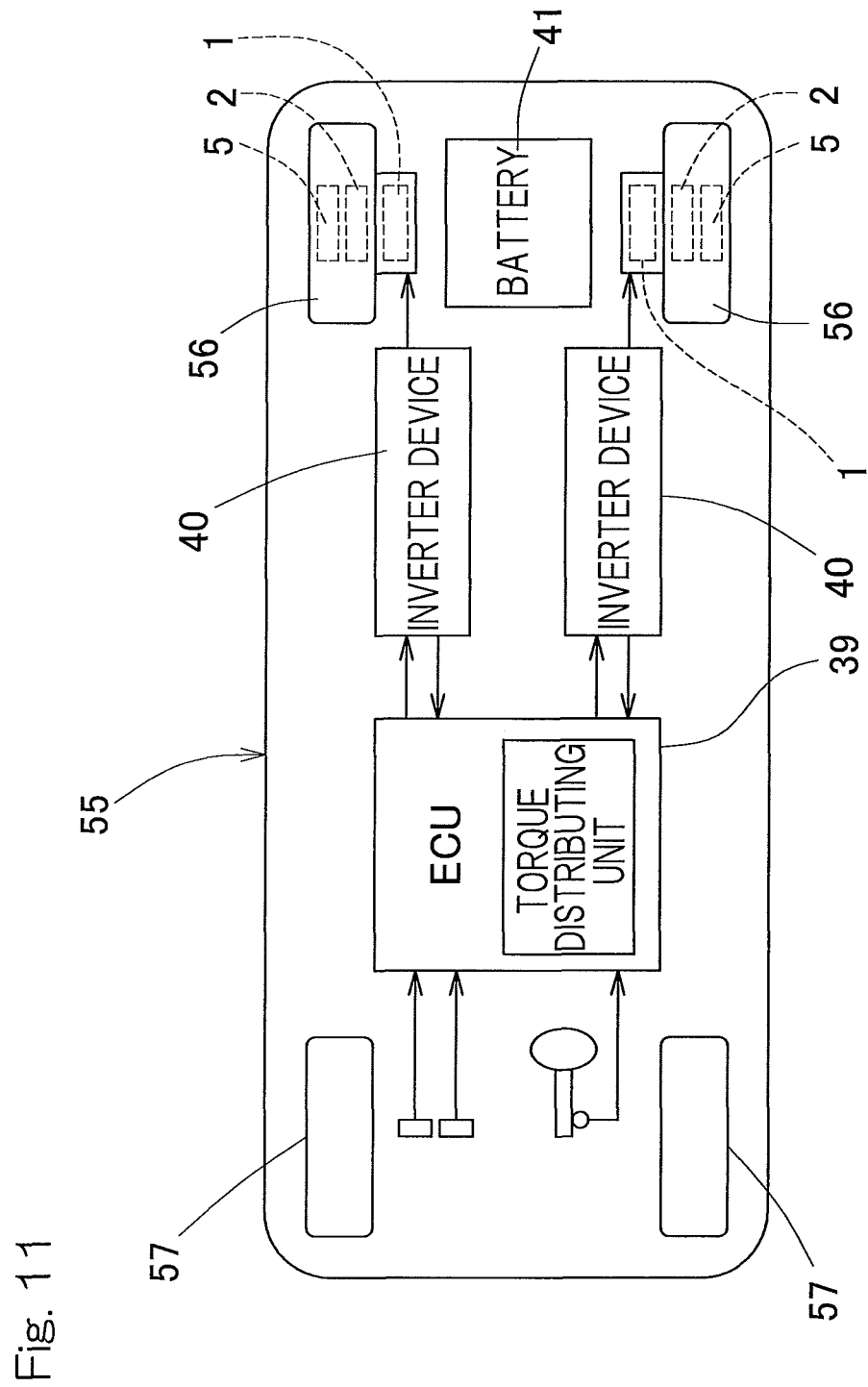
FIG. 11 is a schematic diagrams showing an electrically powered automotive vehicle having mounted thereon the in-wheel motor drive device designed in accordance with any one of the first- to third-mentioned preferred embodiments of the present invention.

FIG. 11 illustrates a diagram showing the schematic structure of the electrically powered automotive vehicle having employed therein the in-wheel motor drive device according to any one of the foregoing embodiments of the present invention. This electrically powered automotive vehicle is a four wheeled vehicle and has left and right rear wheels 56 mounted on the vehicle body 55 serving as drive wheels and also has left and right front wheels 57 mounted on the vehicle body 55 serving as driven wheels. The wheel 57 serving as the front wheel is rendered to be a steerable wheel. The electrically powered automotive vehicle in this example is equipped with a drive unit for driving the left and right drive wheels 56 and 56 that are driven by the electric motors 1 and 1 separate from each other. The rotation of the electric motor 1 is transmitted to the wheel 56 through the speed reducer 2 and the wheel support bearing assembly 5. The drive unit referred to above is such that the electric motor 1 itself or a part thereof is disposed within the wheel 56 while forming the in-wheel motor drive device including the electric motor 1, the speed reducer 2 and wheel support bearing assembly 5.

Since the in-wheel motor drive device designed in accordance with any one of the previously described embodiments of the present invention is incorporated in this electrically powered automotive vehicle, occurrence of the abnormality such as an excessive frictional wear, for example, of the speed reducer or the like can be avoided therebefore even under the low temperature condition in which the oil supply amount is insufficient.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Electric motor
2 . . . Speed reducer
5 . . . Wheel support bearing assembly
28 . . . Oil pump
29 . . . Tank
49 . . . Output limitter
51 . . . Storage part
56, 57 . . . Wheel
Sa . . . Temperature detector

What is claimed is:

1. An in-wheel motor drive device including an electric motor to drive a wheel, a wheel support bearing assembly to support the wheel, and a speed reducer to reduce the rotation of the electric motor and then to transmit it to the wheel support bearing assembly, the speed reducer being lubricated by a lubricant oil supplied under pressure by an oil pump, which in-wheel motor drive device comprises:
   a temperature detector to detect the temperature of the lubricant oil or the temperature of the electric motor; and
   an output limitter configured to limit an output of the electric motor which output drives the wheel when the temperature detected by the temperature detector attains a value not higher than a predetermined threshold value,
   wherein the oil pump is built in the in-wheel motor drive device and is adapted to be driven by the rotation of the speed reducer,
   wherein the output limiter comprises a determining part which determines whether or not the temperature is not higher than the predetermined threshold at all times that the drive device is electrically powered on, and
   when the temperature detected increases from the value not higher than the predetermined threshold value to a value higher than the predetermined threshold value, the output limiter gradually mitigates the limit value of the output of the electric motor to increase corresponding to the increase in the temperature detected by the temperature detector.

2. The in-wheel motor drive device as claimed in claim 1, in which the output limitter includes a storage part to store a limit value of the output of the electric motor as a map for each temperature detected by the temperature detector.

3. The in-wheel motor drive device as claimed in claim 1, further comprising a tank to store the lubricant oil therein, wherein the temperature detector is provided in the tank.

4. An in-wheel motor drive device comprising:
   an electric motor to drive a wheel;
   a wheel support bearing assembly to support the wheel;
   a speed reducer to reduce the rotation of the electric motor and to transmit the reduced rotation to the wheel support bearing assembly;
   a tank to store lubricant oil therein;
   an oil pump to supply lubricant oil from the tank to the speed reducer under pressure;
   a temperature detector to detect the temperature of the lubricant oil in the tank; and
   an output limitter configured to limit an output of the electric motor which output drives the wheel during driving of the electric motor when the temperature of the lubricant oil in the tank detected by the temperature detector is at or below a predetermined threshold value,
   wherein the oil pump is built in the in-wheel motor drive device and is adapted to be driven by the rotation of the speed reducer,
   wherein the output limiter comprises a determining part which determines whether or not the temperature is not higher than the predetermined threshold at all times that the drive device is electrically powered on, and
   when the temperature detected increases from the value not higher than the predetermined threshold value to a value higher than the predetermined threshold value, the output limiter gradually mitigates the limit value of the output of the electric motor to increase corresponding to the increase in the temperature detected by the temperature detector.

* * * * *